United States Patent [19]

Suh

[11] Patent Number: 4,845,515

[45] Date of Patent: Jul. 4, 1989

[54] RECORDING MATERIAL UTILIZING MULTILAYER BI/SE FILM

[75] Inventor: Suk Y. Suh, Bridgewater, N.J.

[73] Assignee: Hoechst Celanese Corp., Somerville, N.J.

[21] Appl. No.: 87,115

[22] Filed: Aug. 19, 1987

[51] Int. Cl.$^4$ ............................................. G01D 9/00
[52] U.S. Cl. ................................................ 346/135.1
[58] Field of Search ................. 346/135.1, 76 L, 1.1

[56] References Cited

U.S. PATENT DOCUMENTS 3,959,799  5/1976  Gambino .......................... 346/135.1
4,317,123  2/1982  Namiki ............................. 346/135.1

Primary Examiner—E. A. Goldberg
Assistant Examiner—Mark Reinhart
Attorney, Agent, or Firm—Burns, Doane Swecker & Mathis

[57] ABSTRACT

Provided is a recording material comprised of a substrate and a metallic recording layer, with the metallic recording layer comprising alternating layers of Bi and Se metal. At least five such alternating layers are used to comprise the recording layer, with from 13 to 17 layers being preferred. The resulting recording material exhibits improved sensitivity, excellent storage stability and archivability, as well as good signal-to-noise ratio.

20 Claims, 3 Drawing Sheets

Bi/Se-MULTILAYER MEDIUM

Te-THIN FILM MEDIUM

RECORDING MATERIAL UTILIZING MULTILAYER BI/SE FILM

BACKGROUND OF THE INVENTION

1. Field of the Invention

The present invention relates to an information recording medium utilizing a metallic recording layer. More particularly, the metallic recording layer comprises Bi and Se, with the recording material exhibiting excellent sensitivity, storage stability and archivability, as well as good signal-to-noise ratio.

2. Description of the Prior Art

Information storage systems in which information is stored by selective ablation, evaporation, removal or modification of a recording medium irradiated spotwise with a focused laser beam or the like having high density or strong energy are known as the so-called heat mode recording processes to those skilled in the art. The heat mode recording process is a dry process which does not need chemicals or treating solutions and in which a real-time recording can be made. According to this process, information can be quickly recorded in a high contrast form with a large capacity in respect to the amount of information recordable per unit area of recording medium, with the ability to add information later. Due to such advantages, the heat mode recording process is of wide application in a field in which a microimage recording medium, a computer output microfilm, a video disk, a computer signal memory medium or the like is involved.

The heat mode recording medium such as is used particularly as the video disk or the computer signal memory medium generally comprises an information recording layer formed on a suitable substrate such as a circular plate or disk of glass or a synthetic resin. When a pulse-modulated laser beam is focused on the recording layer rotated at a high speed, holes of about 0.6 to 1.5 microns in width are formed in the areas where the recording layer is irradiated with the laser beam, whereby information is recorded in the recording medium. The positions and sizes of the formed holes depend on the waveform of laser beam utilized, and correspond to the inputted information. The readout of the information stored in the recording medium is carried out by applying to the recording medium being rotated at a high speed a focused, weak laser beam whose intensity is lower than the threshhold value necessary to produce a hole in the recording layer, and hence detecting the variation of the reflected light.

The characteristics required of a heat mode recording medium are not only high sensitivity but also a high signal-to-noise ratio (hereinafter referred to as "S/N ratio"), storage stability, availability and the like. It is necessary for attaining a high S/N ratio in a video disk, a computer signal memory medium or the like, that the holes formed in the recording medium upon the selective ablation by a laser beam are substantially free of irregularities or disorders, and that the information readout light beam reflectivity or transmittance differences between the opening areas and the non-opening areas of the recording medium is as great as possible, which is equivalent to saying that the contrast is as high as possible. The terms "hole" and "opening" used herein are intended to mean ablated portions of the recording material in which information is stored.

Conventional recording media or materials used in heat mode recording or the like include those comprising a layer of an inorganic material, such as a metal or a metallic compound, and those comprising a layer of an organic material such as a dye, a pigment or a mixture thereof with a plastic. For recording information on such recording materials, the layer of the inorganic or organic material is irradiated with a laser beam to be evaporated or deformed in part to form a hole, or is caused to be subjected to a partial chemical change such as a change in degree of oxidation or in light absorptivity or reflectivity. In the case of a partial chemical change, the sensitivity of the recording material is generally so insufficient that the contrast between the changed areas and the unchanged areas is too low to obtain a high S/N ratio, and the archivability of the recorded material is too poor to be satisfactory in a practical sense. On the other hand, in the case of hole formation which is carried out by removing part of a recording layer provided on a substrate, in general, the recording material is relatively good but still unsatisfactory in a practical sense with regard to sensitivity and S/N ratio. The recording material, however, is defective in storage stability and archivability under a high humidity and in an oxidating atmosphere since its recording layer is exposed to the air for enabling the evaporation or removal of the recording layer. While the recording material used in a deformation-removal method is satisfactory in storage stability and archivability, it is unsatisfactory in sensitivity and S/N ratio.

Therefore, it is an object of the present invention to provide a heat mode recording material which not only has a high sensitivity but also is excellent in S/N ratio, storage stability and archivability.

It has been known to employ bismuth/selenium bi- or tri-layer systems as the recording layers in optical information media, i.e., media in which the information is recorded and/or read by optical means. The reason being that the formation of bismuth selenide from bismuth and selenium is a strong exothermic reaction. Thus, the efficiency of hole-machining by laser irradiation in thin bismuth films is increased by adding a selenium layer thereto due to the heat generated during the reaction of the bismuth with the selenide.

In Miller et al, "A Gallium-Arsenide Laser Facsimile Printer," *Bell Systems Technology Journal,* Vol. 58, p. 1909 (1979), there is described a two-layer film consisting of about 600 Å of bismuth followed by approximately 650 Å of selenium evaporated onto a low-surface-energy acrylic polymer substrate. This selenium thickness is anti-reflective at a thick cavity, GaAlAs, double-hetero junction laser wavelength (0.885 microns), permitting about 85% of the incident laser power to be absorbed in the bismuth layer, and the composition is nearly stoichiometric for $Bi_2Se_3$. An exothermic reaction occurs when the energy delivered by the pulsed beam melts a disk of BiSe and the molten materials mix. The released energy, in combination with the increased absorption due to the selenium anti-reflective property, more than offsets the thermal mass added by the selenium. In fact, it is disclosed that a Bi/Se bilayer can achieve machining threshold at laser beam intensities four to six times lower than those required for bismuth alone.

Other disclosures of Bi/Se films useful as information recording layers include those in U.S. Pat. Nos. 4,000,492; 3,889,272; 3,911,444; 3,560,994; 4,290,075; 4,385,305 and 4,461,807.

Generally, however, the bilayer and trilayer bismuth-/selenium films heretofore known suffer from a number of shortcomings when used in digital optical recording applications. They normally work in the transmission mode only. Excessive debris is formed around written holes, which results in a poor S/N ratio. For a given wavelength of a laser beam, the thickness is automatically fixed to satisfy an anti-reflective condition and the thickness ratio between Bi and Se is such as to satisfy the stoichiometry of $Bi_2Se_3$. This does not allow one optimization of the thickness for the best hole-opening characteristics. As well, sensitivity can be improved.

Accordingly it is another object of the present invention to provide a Bi/Se recording layer for use in optical information recording applications which alleviates the aforementioned problems with conventional Bi/Se films.

Another object of the present invention is to provide a recording material comprising a Bi/Se recording layer which exhibits improved sensitivity as well as good S/N ratio, storage stability and archivability.

These and other objects, as well as the scope, nature and utilization of the invention, will be apparent to those skilled in the art from the following description and the appended claims.

SUMMARY OF THE INVENTION

The foregoing objectives are realized in the practice of the present invention by providing a recording material comprising a substrate and a metallic recording layer, wherein the metallic recording layer comprises at least five alternating layers of Bi and Se, and preferably from 5 to 17 alternating layers of Bi and Se. The resulting recording material exhibits improved sensitivity, good storage stability and archivability, as well as good signal-to-noise ratio.

In a preferred embodiment, selenium comprises the lowermost layer, i.e., that closest to the substrate, of the alternating layers. In another preferred embodiment, selenium comprises the two most outermost layers of the overall metallic recording layer, i.e., the topmost and lowermost layers.

Besides the substrate and the metallic recording layer, the recording material of the present invention can also comprise other layers. For example, a subbing or smoothing layer can be employed if desired, as well as a transparent protective layer. When an anti-reflective structure is desired, a dielectric or spacer layer may also be employed.

DETAILED DESCRIPTION OF THE PREFERRED EMBODIMENTS

The metallic recording layer employed in the recording material of the present invention comprises at least five alternating layers of bismuth (Bi) and selenium (Se) metal. It is preferred that each respective layer is comprised of purely the respective metal. This will insure a bismuth/selenium exothermic chemical reaction upon laser irradiation. Some presence of metal oxides, etc., may, however, occur.

While five is the minimum number of alternating layers to be employed in the practice of the present invention, the maximum number of layers can be any number based upon practical limitation. In general, it is preferred that the number of alternating layers of bismuth and selenium employed is in the range of from 5 to about 17 layers, with about 13 to about 17 alternating layers being most preferred. The higher number of layers is generally preferred because the more alternating layers used, the larger the contact area between the bismuth and selenium metals. More interaction and hence a more rapid and more overall complete reaction occurs as a result, which provides for a more sensitive recording system, i.e., easier hole formation.

The layers of bismuth and selenium metal are preferably as thin as possible, but should be continuous layers of the metal. Layer thicknesses in the range of about 60 to 80 Angstroms are therefore preferred. However, if thinner continuous layers can be applied, such layers would be most preferred. The thickness of the layer can of course vary greatly, as can the thickness of each alternating layer within the overall Bi/Se metallic recording layer. The overall design of the Bi/Se metallic recording layer of the present invention will depend upon a consideration of all practical limitations, cost and the system desired for achieving an intended effect. For example, the thickness of the layers, and hence the overall Bi/Se metallic recording layer, can be designed for an anti-reflective system if desired. This, however, is not a requirement of the present system, thereby lending great flexibility to the practice of the present invention. All of these manipulations are within the skill of the artisan, it being important that at least five alternating layers of bismuth and selenium are used in the practice of the present invention.

In the arrangement of the layers, it is preferred that the lowermost layer, i.e, that closest to the substrate, is a layer of selenium metal. It has been found that use of a selenium layer as the lowermost layer results in a recording material exhibiting greater efficiency and requiring a lower threshold. As well, the selenium layer acts as an oxygen barrier for the upper active layers.

Figure 1:
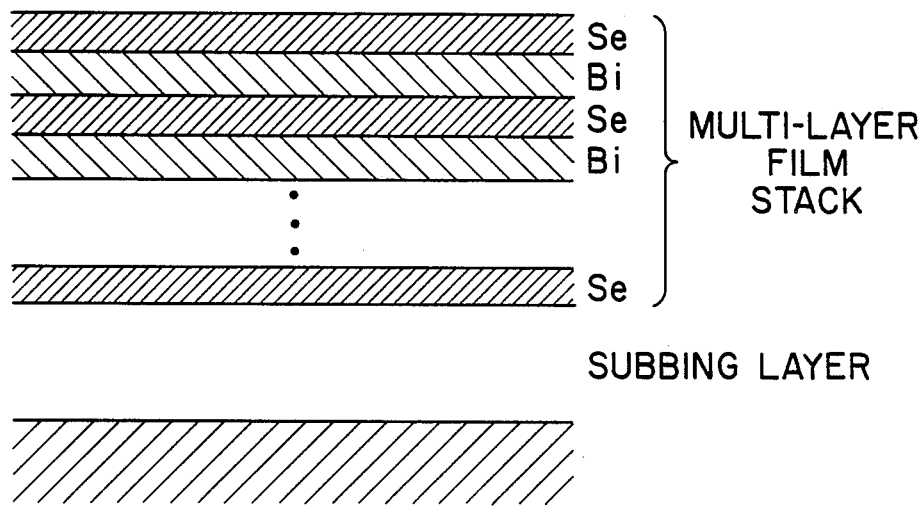
FIG. 1 is a schematic of a recording material in accordance with the present invention.

A depiction of such an arrangement of alternating layers of selenium and bismuth is shown in FIG. 1 of the Drawing. Therein, a selenium layer is the lowermost layer of the overall Bi/Se recording layer. FIG. 1 also shows the presence of a subbing layer on the substrate. The presence of a subbing layer is optional, and can be employed if so desired.

It is also preferred that the topmost layer of the overall Bi/Se recording layer is a selenium layer, as shown, for example, in FIG. 1. This is due to the good oxygen barrier characteristics of the selenium. When the topmost and lowermost layers are selenium, as shown in FIG. 1, the result is a Bi/Se metallic recording layer essentially enclosed with selenium, which is a preferred embodiment of the present invention.

The various alternating layers of bismuth and selenium can be formed by means of conventional film-forming techniques for metals, for example, vacuum evaporation-deposition, sputtering, ion-plating, electroplating, electroless plating or plasma deposition. The vacuum evaporation-deposition technique is preferred because it is not only simple in operation but also excellent in reproducibility. It is most preferred to effect the evaporation-deposition under high vacuum, e.g., under a pressure of $10^{-5}$ Torr or less.

The improved sensitivity of the present recording layer is primarily due to the exothermic reaction of the Bi/Se layers which occurs upon laser irradiation, combined with the multiple alternating layers used in the present invention. The present system can be tuned to a particular wavelength by employing an anti-reflective structure, or can be sensitive to a wide range of wavelengths by not employing an anti-reflective structure. The latter is preferred as it allows greater flexibility in operation. The use of multiple alternating layers of bismuth and selenium not only results in a more flexible Bi/Se system but a more sensitive system in that it requires less energy to attain a desired contrast level than conventional bi and tri-layer Bi/Se recording layers.

As examples of the substrate to be used in the recording material of the present invention, there can be mentioned films and plates of inorganic materials such as glass, mica and alloys of aluminum; and organic materials, for example, polymers such as polyesters, polypropylene, polycarbonate, polyvinyl chloride, polyamides, polystyrene and polymethyl methacrylate and modified units of the above polymers and blends thereof. Of such materials, especially preferred are films and plates of polyesters, polycarbonate and of polymethyl methacrylate. When the smoothness of the surface of the substrate itself has a great influence on the S/N ratio of a recording material as in the case of a video disk or the like, there may be employed a subbing or smoothing layer. It is preferred that the subbing layer is comprised of a non-photosensitive polymer layer.

In the present invention, it is preferred that the non-photosensitive polymer be at least one of the rubber type polymers, vinyl polymers, carbonic acid ester type polymers, cellulose type polymers, epoxy type polymers, phenol type polymers, urea type polymers or alkyd type polymers. Suitable examples of these are as follows.

As a rubber type polymer, a cyclized rubber type polymer such as, for example, cyclized natural rubber or cyclized polyisoprene is especially preferred.

Suitable vinyl type polymers include polyvinyl alcohol, polyvinyl chloride and polyvinyl butyral.

A suitable carbonic acid ester type polymer is a polycarbonate of bisphenol A.

Suitable cellulose type polymers, include cellulose acetate, cellulose acetate butyrate and cellulose propionate.

A suitable epoxy type polymer is polyglycidyl methacrylate.

A suitable phenol type polymer is a phenol formaldehyde resin.

A suitable urea type polymer is polyurea.

A suitable alkyd type polymer is a glycerine phthalic acid resin.

In the description of the present invention, the term "polymer" is used in a broad sense, including not only a homopolymer of the constituent monomer but also a copolymer of the constituent monomer with another comonomer.

Among the above-mentioned polymers, a rubber type polymer is especially preferred because it exerts a buffering action when the thermal expansion coefficient of the plastic substrate is different from that of the recording layer.

In the recording material of the present invention, the thickness of the subbing layer should preferably be from 0.0 to 10 microns, more preferably from 0.1 to 1 microns, and most preferably from 0.2 to 1 microns. For if the thickness of the subbing layer is at least 0.01 micron, depressions and the like present on the surface of the substrate can be sufficiently filled in to achieve the intended effect of the present invention. However, ordinary substrates, particularly commercially available plastic plates, have protrusions and depressions of about 0.1 micron size on the surface thereof, quite apart from any actual damage of the surface. For this reason, it is particularly preferred that the thickness of the subbing layer be at least 0.1 micron or more, preferably at least 0.2 micron to provide a safer margin. Regarding the upper limit of the subbing layer, in order to maintaining a uniform thickness of the layer, its preferred thickness is up to 10 microns, more preferably up to 1 micron.

The recording material of the present invention can be prepared, for example, by a process involving coating a plastic substrate with a solution of a polymer in a solvent utilizing a spin coating or similar method, baking the coating at such a temperature as not to cause thermal deformation and then forming the recording film on the baked coating by a known method such as discussed previously, e.g., vacuum deposition. In order to obtain a subbing layer which is thin and has a smooth surface, the spin coating method is preferably used.

The recording material of the present invention may further comprise a transparent outermost protective layer for preventing mechanical damage. The transparent protective layer may comprise an organic polymer as either the main or the sole component.

As examples of organic polymers that may be used in the transparent protective layer, there can be mentioned polyvinylidene chloride, copolymers of vinylidene chloride and acrylonitrile, polyvinyl acetate, polyimides, polyvinyl cinnamate, polyisoprene, polybutadiene, polystyrene, polymethyl methacrylate, polyurethanes, polyvinyl butyral, fluororubbers, polyamides, polyesters, epoxy resins, cellulose acetate and terpolymers of vinyl acetate-vinyl butyral-vinyl alcohol; modified polymers thereof; and copolymers of monomer units of the above polymers. They may be used either alone or in mixture. Polyesters, flurorubbers and terpolymers of vinyl acetate-vinyl butyral-vinyl alcohol are especially preferred.

A silicone oil, an antistatic agent, and a crosslinking agent for improving film strength and antistatic properties may be added to the organic polymer for the transparent protective layer. If desired, the transparent protective layer may be of a multilayer structure.

The transparent protective layer can be formed by the coating of a coating composition containing an organic polymer dissolved in a suitable solvent, or by the lamination of a thin film of an organic polymer. The thickness of the transparent protective layer is preferably in the range of from 0.1 to 10 microns.

The recording material according to the present invention exhibits improved sensitivity, excellent storage stability and archivability, as well as shape of holes to be formed upon irradiation with a laser beam and, good S/N ratio.

Moreover, the multi-layered Bi/Se recording layers of the present invention also offer the following advantages as compared to conventional Bi/Se recording layers. Readout can be by either transmission or reflection. Film thickness no longer needs to be fixed so that it can be used as an optimization parameter. Contrast ratio and S/N ratio can be increased by increasing the initial reflectivity. The debris problem is minimized as the hole ca be formed in the thin film without moving a large quantity of materials around by using much thinner films than with the bi-layer film. Moreover, the rate of the reaction between bismuth and selenium will increase due to the increased contact area per unit mass between the two materials. This allows fast hole formation due to the rapid chemical reaction between bismuth and selenium. Furthermore, the delivery of the enthalphy of mixing in a short time scale by the fast reaction reduces the energy escape from the heated spot, resulting in a higher thermal efficiency, i.e., an improved sensitivity.

The following example is given as a specific illustration of the claimed invention. It should be understood, however, that the specific details set forth in the example are merely illustrative and in nowise limitative. All parts and percentages in the example and the remainder of the specification are by weight unless otherwise specified.

EXAMPLE

Sample Preparation

The metal thin films used in the experiment were evaporated at 1 Å/sec by a thermal evaporator (Varian-3118) equipped with a multi-source electron-beam gun (Airco Themscal STH-216) at the base pressure of $2 \times 10^{-6}$ torr. The deposition rate was monitored and controlled by electron impact atomic emission spectroscopy. Uniformity of the film thickness was achieved by the rotation (spin rate approximately 300 rpm), as well as the planetary motion (20 rpm) of the substrate holder. The average source-to-substrate distance was about 45 cm.

The substrates were $5 \times 7.5$ cm$^2$ microscope slides for static testing and 130 cm diameter optically polished glass disks for dynamic testing, and the samples were about 1.2 mm in thickness. All the substrates were overcoated with poly-isobutyl methacrylate (IBM) before the deposition of the recording layers. A subbing layer (thickness approximately 1 micron) was applied to the substrate by spin coating using a 5% concentration (by weight) of poly-isobutyl-methacrylate in methyl ethyl ketone. The overall metallic Bi/Se recording layer consisted of nine selenium layers (65 Angstroms each) and eight bismuth layers (60 Angstroms each).

Recording System

The recording system employed uses a krypton ion laser to provide 50 mW media write power The air-bearing turntable spins disks to 3000 rpm with submicron stability. Both analog and digital focus servo-controllers are used. The write-and-read optoelectronics have a 30 MHz bandwidth. Software running on a PDP 11/44 and Cromenco Z-80 microcomputer writes data onto the optical disk and then does noise analysis on the read-out signal. A Tektronix transient waveform digitizer (7612 AD) samples the read signal every 5 ns with 8-bit resolution. The dynamic test system shares much of its hardware with a static optical materials evaluation system. The expanded optical beam overfills a 0.5 NA objective lens, which focuses the beam to a nearly diffraction-limited spot size. A pair of computer-controlled translation stages positions the film sample beneath the focused beam. The writing beam is obtained when a substantial fraction of the Kr power is deflected into the optical path, while a continuously deflected, low power beam serves as the reading beam. Polarizing elements allow the reflected beam to be directed to a photo-detector.

Results

The bits written on the multi-layered Bi/Se films are very clean and comparable to those of the best known optical recording media: Te films. For the purpose of comparison, pits written on a 300 Å Te thin film with the identical experimental conditions were compared. The writing laser beam power was 5 mW and the surfac speed was about 20 m/s. Data rates for writing were 20 M bits/sec, and the track pitch was about 5 microns. During the read-out, the disk spin rate was reduced to about 5 m/s of the surface speed in order to compensate for the speed of the digitizer.

Figure 2A:
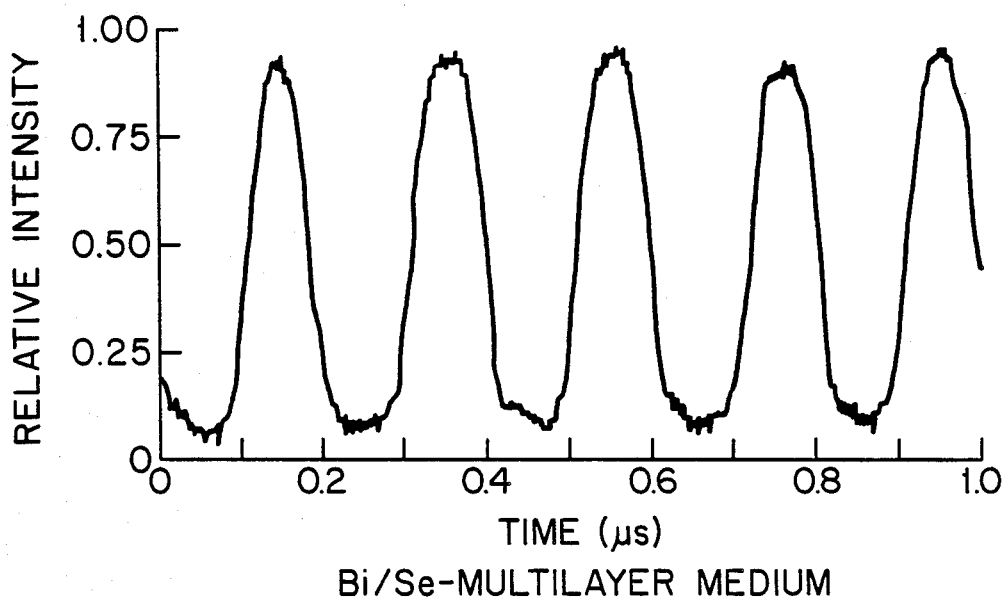
FIGS. 2A and 2B are a graphic representation of relative intensity vs. time for a Bi/Se multilayer medium in accordance with the present invention and a conventional tellurium thin film medium.
Figure 2B:
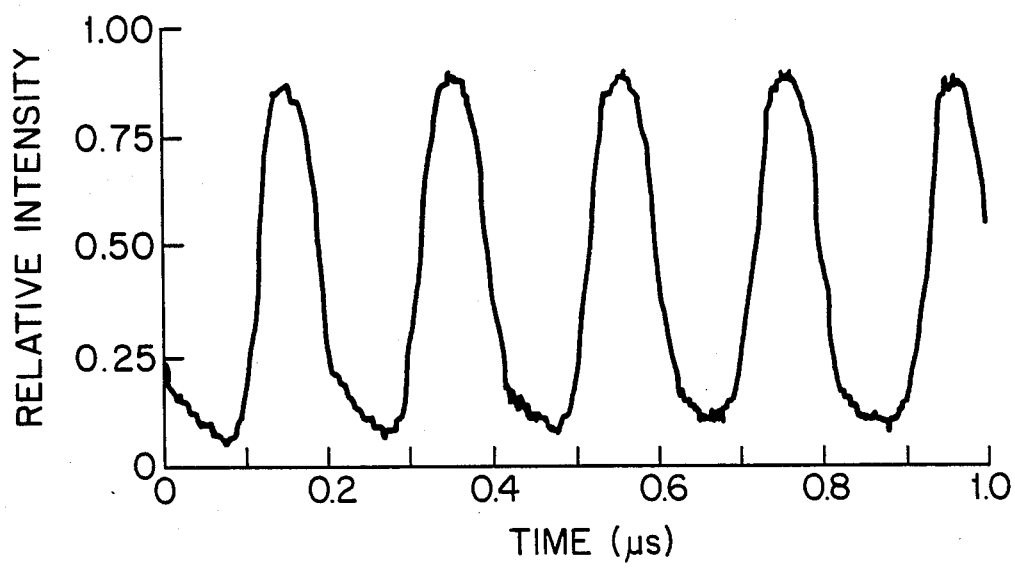

FIG. 2 shows the read-out signals for both the Bi/Se medium of the present invention and the Te medium. There was no significant difference between them. CNR of 55 dB (30 kHz bandwidth) was obtained for the multi-layered Bi/Se media, using an analog spectrum analyzer. Under the same conditions, Te media showed a CNR of 54 dB. It should be noted, however, that the samples were prepared in a Class 100 clean-room environment, but the tests were conducted in a normal, typical electronics laboratory.

Figure 3:
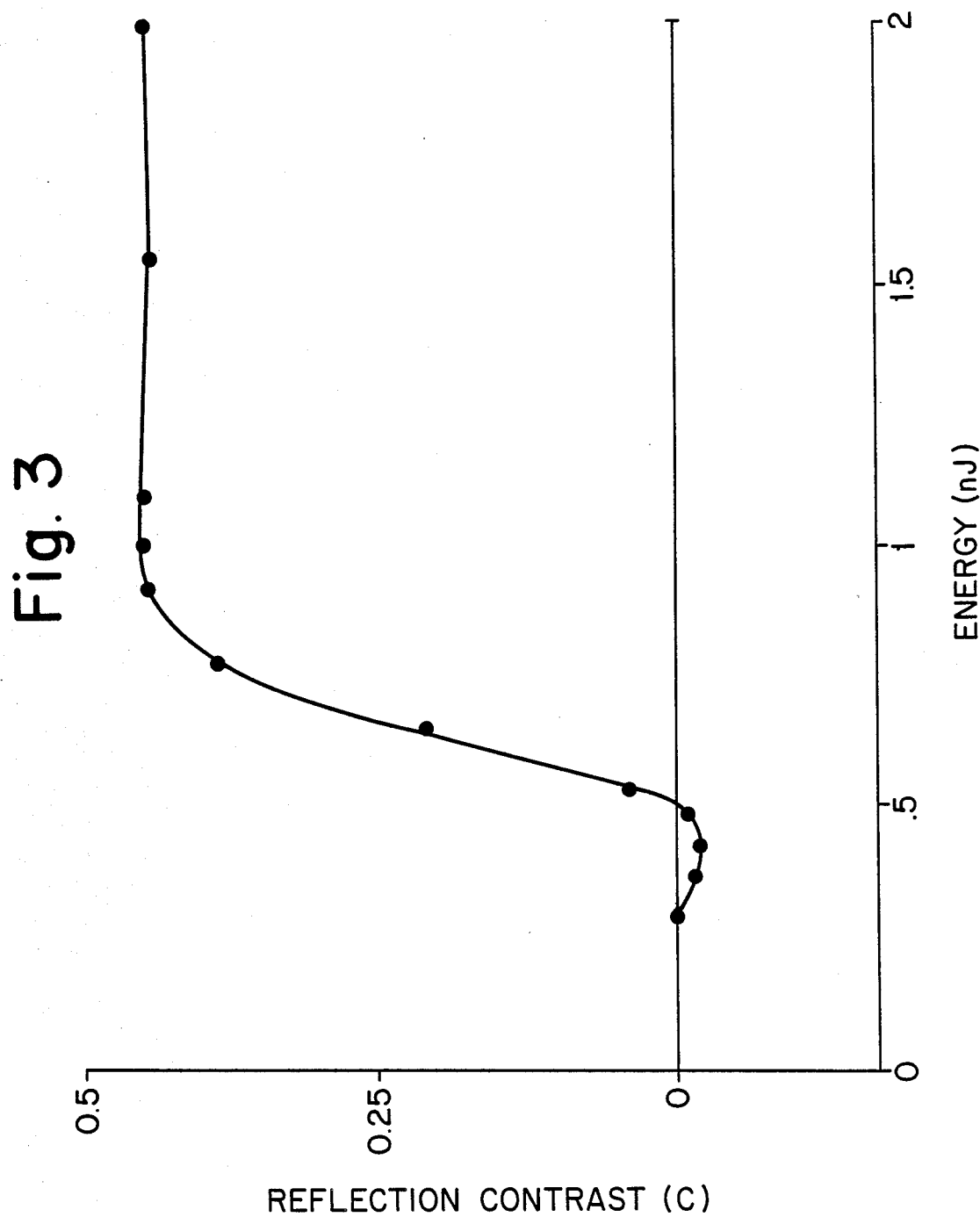
FIG. 3 is a graphic representation of reflective contrast vs. energy for a Bi/Se seventeen layer medium in accordance with the present invention.

The Bi/Se medium consisting of the alternating nine selenium layers (65 Å each) and eight bismuth layers (60 Å each) showed an initial reflectivity of 43% at the writing laser beam wavelength. FIG. 3 shows the result of the static test on this sample. The contrast, C was defined as:

$$C = (Rb - Ra)/(Ra + Rb),$$

where Ra and Rb are the reflectivity of the recording film before and after optical writing, respectively. The writing pulse width was 50 nsec. Threshold energy is only about 0.5 nJ, and the fully matured hole develops at a writing power of about 0.75 nJ. The performance was comparable to that of the optimized Te thin films, and was much improved over conventional Bi/Se films, which generally requires about 5 nJ as the threshold energy. For example, see *Bell System Technical Journal*, November 1979, p. 1961.

Although the invention has been described with preferred embodiments, it is to be understood that variations and modifications may be resorted to as will be apparent to those skilled in the art. Such variations and modifications are to be considered within the purview and the scope of the claims appended hereto.

What is claimed is:

1. A recording material for recording information in a metallic recording layer comprising a substrate and a metallic recording layer, wherein the metallic recording layer comprises at least four alternating layers of Bi and Se.

2. The recording material of claim 1, wherein the metallic recording layer comprises from 5 to about 17 alternating layers of Bi and Se.

3. The recording material of claim 2, wherein the lowermost layer of the alternating layers of Bi and Se is a layer of selenium.

4. The recording material of claim 1, wherein the metallic recording layer comprises from about 13 to about 17 alternating layers of Bi and Se.

5. The recording material of claim 4, wherein the lowermost layer of said alternating layers is a layer of selenium.

6. The recording material of claim 1, wherein the lowermost layer of said alternating layers is a layer of selenium.

7. The recording mat of claim 6, wherein the topmost layer of said alternating layers is a layer of selenium.

8. The recording material of claim 1, further comprising a subbing layer.

9. The recording material of claim 1, further comprising a transparent protective layer.

10. The recording material of claim 1, wherein the structure is an anti-reflective structure.

11. The recording material of claim 1, wherein the metallic recording layer comprises 17 alternating layers of Bi and Se.

12. The recording material of claim 1, wherein the material is in disk format.

13. A system for recording optical information comprising a recording material having a substrate and a metallic recording layer and a laser source for irradiating the metallic recording layer with a laser beam in accordance with the information to be recorded, the improvement which comprises said metallic recording layer comprising at least five alternating layers of Bi and Se.

14. The system of claim 13, wherein the metallic recording layer comprises from 5 to about 17 alternating layers of Bi and Se.

15. The system of claim 13, wherein the metallic recording layer comprises from about 13 to about 17 alternating layers of Bi and Se.

16. The system of claim 13, wherein the lowermost layer of said alternating layers is a layer of selenium.

17. The system of claim 16, wherein the topmost layer of said alternating layers is a layer of selenium.

18. A recording material for recording information in a metallic recording layer comprising a substrate and a metallic recording layer, wherein the metallic recording layer comprises 17 alternating layers of Bi and Se, with the topmost layer and lowermost layer of said alternating layers being layers of selenium.

19. The recording material of claim 2, wherein the lowermost layer of said alternating layers is a layer of selenium.

20. The recording material of claim 19, wherein the topmost layer of said alternating layers is a layer of selenium.

* * * * *